(12) United States Patent
Jacquemet et al.

(10) Patent No.: US 6,294,269 B1
(45) Date of Patent: Sep. 25, 2001

(54) COEXTRUSION BINDER, ITS USE IN A MULTILAYER STRUCTURE AND THE STRUCTURE THUS OBTAINED

(75) Inventors: Regis Jacquemet; Christophe Le Roy, both of Evreux (FR)

(73) Assignee: Elf Atochem, S.A., Puteaux (FR)

( * ) Notice: Subject to any disclaimer, the term of this patent is extended or adjusted under 35 U.S.C. 154(b) by 0 days.

(21) Appl. No.: 09/480,631

(22) Filed: Jan. 10, 2000

Related U.S. Application Data

(63) Continuation of application No. 08/883,577, filed on Jun. 26, 1997, now Pat. No. 6,087,001.

(30) Foreign Application Priority Data

Jun. 27, 1996 (FR) .................................................. 96 08004

(51) Int. Cl.[7] .................................................. B32B 27/08
(52) U.S. Cl. ........................................... 428/516; 428/523
(58) Field of Search ................................. 428/474.4, 402, 428/407, 476.9, 500, 516, 523, 475.5; 525/193

(56) References Cited

U.S. PATENT DOCUMENTS

| 4,397,916 | 8/1983 | Nagano . | |
|---|---|---|---|
| 4,906,690 | 3/1990 | Hasenbein et al. . | |
| 5,045,401 | * 9/1991 | Tabor et al. | 428/516 |
| 5,073,420 | 12/1991 | Yano et al. . | |
| 5,096,775 | * 3/1992 | Sato et al. | 428/327 |
| 5,238,718 | 8/1993 | Yano et al. . | |
| 5,296,552 | 3/1994 | Ohmae et al. . | |
| 5,464,905 | * 11/1995 | Tsutsui et al. | 525/240 |

FOREIGN PATENT DOCUMENTS

| 35392 | 9/1981 | (EP) . |
| 323650 | 7/1989 | (EP) . |
| 365266 | 4/1990 | (EP) . |
| 501762 | 9/1992 | (EP) . |
| 95/05940 | * 3/1995 | (WO) . |

* cited by examiner

Primary Examiner—Jeffrey C. Mullis
(74) Attorney, Agent, or Firm—Smith, Gambrell & Russell, LLP

(57) ABSTRACT

The invention relates to a coextrusion binder obtained by grafting a mixture of a copolymer of ethylene and of an elastomer of EPR type with an unsaturated carboxylic acid anhydride or its derivatives. The grafted mixture is optionally diluted in another copolymer of ethylene. The binder is useful in preparing polyolefin/binder/polyamide or EVOH structures. These structures are useful in preparing rigid hollow bodies

7 Claims, No Drawings

COEXTRUSION BINDER, ITS USE IN A MULTILAYER STRUCTURE AND THE STRUCTURE THUS OBTAINED

CROSS-REFERENCE TO RELATED APPLICATION

This application is a continuation of U.S. application Ser. No. 08/883,577, filed Jun. 26, 1997, now U.S. Pat. No. 6,087,001.

FIELD OF THE INVENTION

The present invention relates to a coextrusion binder, to its use in preparing a multilayer structure and to the structure thus obtained.

More specifically, the coextrusion binder of the present invention comprises:

at least one polymer (A) comprising at least 75 mol % of ethylene and which has an $MI_2/[\eta]^{-8.77}$ ratio with an absolute value of greater than 15, at least one polymer (B) different from (A) chosen from:
  polymers (B1) comprising at least 50 mol % of ethylene,
  block copolymers (B2) of styrene, (B) has an $MI_2/[\eta]^{-8.77}$ ratio with an absolute value of greater than 15, the mixture of (A) and (B) being grafted with an unsaturated carboxylic acid or a functional derivative of this acid, the cografted mixture of (A) and (B) optionally being diluted in a polymer (C) chosen from
  homo- or copolymers (C1) of ethylene
  block copolymers (C2) of styrene the binder having:
  (a) an ethylene content which is not less than 70 mol %,
  (b) a carboxylic acid content, or a content of its derivative, of 0.01 to 10 weight % with respect to the weight of the binder, and
  (c) an $MI_{10}/MI_2$ ratio of 5 to 20, where $MI_2$ is the melt flow index at 190° C. under a load of 2.160 kg, measured according to ASTM D1238, and $MI_{10}$ is the melt flow index at 190° C. under a load of 10 kg, measured according to ASTM D1238. The intrinsic viscosity In $[\eta]$ denotes the intrinsic viscosity index (dl/g) of a polymer, measured in a decalin solution at 135° C.

The present invention also relates to a multilayer structure comprising a layer comprising the coextrusion binder defined above and, directly attached to this layer, a layer (E) of nitrogen-containing or oxygen-containing polar resin, such as a layer of a polyamide resin, of a saponified copolymer of ethylene and of vinyl acetate (EVOH) or of a polyester resin, or alternatively a metal layer.

The invention also relates to a structure comprising the above structure and, directly attached to the structure, on the side of the binder, either a polyolefin layer (F) or a layer of a resin chosen from the resins of the layer (E) or alternatively a metal layer.

BACKGROUND OF THE INVENTION

These structures are useful for manufacturing flexible or rigid packagings, such as packets or bottles for foodstuffs. These packagings can be manufactured by coextrusion, laminating or coextrusion blow-moulding.

The prior art EP 35392 describes coextrusion binders consisting of:

(i) 1 to 100 weight % of an ethylenic resin modified by grafting originating from an ethylenic polymer which contains 0 to 15 mol % of at least one alpha-olefin having 3 to 30 carbon atoms, as comonomer, and which has an $MI_2/[\eta]^{-8.77}$ ratio which, in absolute value, is not less than 15 and a relative density of 0.88 to 0.98 g/cm³, and (ii) 99 to 0 weight % of a non-modified ethylenic polymer containing 0 to 50 mol % of at least one alpha-olefin having 3 to 30 carbon atoms, as comonomer, and which has an $MI_2/[\eta]^{-8.77}$ ratio which, in absolute value, is not less than 15 and a relative density of 0.86 to 0.96 g/cm³, and which have
  (a) an ethylene content of at least 80 mol %
  (b) a carboxylic acid content (or content of its derivative) of between 0.01 and 10 weight % of the binder
  (c) a relative density of 0.88 to 0.98 g/cm³ and
  (d) an $MI_{10}/MI_2$ ratio of 5 to 18.

DESCRIPTION OF THE INVENTION

However, Applicant has found that these binders exhibited unmelted regions which can bring about delaminations in the structures comprising these binders. The Applicant has found that the cografting, that is to say the grafting of the mixture of (A) and (B), produced binders which are virtually devoid of unmelted regions.

As regards the polymer (A), this is a polyethylene or a copolymer of ethylene with a comonomer chosen from, for example:

alpha-olefins, advantageously those having from 3 to 30 carbon atoms.

Examples of alpha-olefins having 3 to 30 carbon atoms as possible comonomers comprise propylene, 1-butene, 1-pentene, 3-methyl-1-butene, 1-hexene, 4-methyl-1-pentene, 3-methyl-1-pentene, 1-octene, 1-decene, 1-dodecene, 1-tetradecene, 1-hexadecene, 1-octadecene,1-eicosene, 1-docosene, 1-tetracosene, 1-hexacosene, 1-octacosene and 1-triacontene. These alpha-olefins can be used alone or as a mixture of two or of more than two.

Unsaturated carboxylic acid esters, such as, for example, alkyl (meth)acrylates in which the alkyl has from 1 to 24 carbon atoms.

Examples of alkyl acrylate or methacrylate which can be used are in particular methyl methacrylate, ethyl acrylate, n-butyl acrylate, isobutyl acrylate or 2-ethylhexyl acrylate.

Vinyl esters of saturated carboxylic acids, such as, for example, vinyl acetate or vinyl propionate.

The relative density (A) is advantageously between 0.88 and 0.98 g/cm³.

Preferably, (A) is a copolymer of ethylene and of an alpha-olefin of LLDPE (linear low density polyethylene) or VLDPE (very low density polyethylene) type. An regards the polymers (B), (B1) can be chosen from polyethylenes or copolymers of ethylene and of at least one comonomer which can be the same as the comonomers cited for (A) and also a diene.

Mention may be made, as example of polymers (B1) of ethylene/propylene, ethylene/propylene/diene, ethylene/1-butene, ethylene/1-butene/diene, ethylene/propylene/1-butene/diene or ethylene/4-methyl-l-pentene copolymer rubbers, and mixtures of at least two of these rubbers with one another.

(B2) can also be a copolymer containing styrene/butadiene/styrene (SBS) blocks, containing styrene/ethylene-butene/styrene (SEBS) blocks or alternatively containing styrene/isoprene/styrene (SIS) blocks.

The relative density of (B) is advantageously between 0.86 and 0.96 g/cm³.

That is to say that (B) represents a range of polymers from thermoplastic resins to elastomers. Preferably, (B) is an elastomer, ethylene/propylene copolymer rubbers and ethylene/1-butene copolymer rubber are those which are preferred the most. The ethylene/propylene copolymer rubber and the ethylene/1-butene copolymer rubber preferably have a melt flow index (measured at 190° C. according to ASTM D1238-65T) of 0.1 to 20 and an ethylene content of 60 to 90 mol %.

The mixture of (A) and (B) is grafted with an unsaturated carboxylic acid or a functional derivative of this acid.

Examples of unsaturated carboxylic acids are those having 2 to 20 carbon atoms, such as acrylic, methacrylic, maleic, fumaric and itaconic acids. The functional derivatives of these acids comprise, for example, the anhydrides, the ester derivatives, the amide derivatives, the imide derivatives and the metal salts (such as the alkali metal salts) of the is unsaturated carboxylic acids.

Unsaturated dicarboxylic acids having 4 to 10 carbon atoms and their functional derivatives, particularly their anhydrides, are particularly preferred grafting monomers.

These grafting monomers comprise, for example, maleic, fumaric, itaconic, citraconic, allylsuccinic, cyclohex-4-ene-1,2-dicarboxylic, 4-methylcyclohex-4-ene-1,2-dicarboxylic, bicyclo[2.2.1]hept-5-ene-2,3-dicarboxylic and x-methylbicyclo[2.2.1]hept-5-ene-2,3-dicarboxylic acids or maleic, itaconic, citraconic, allylsuccinic, cyclohex-4-ene-1,2-dicarboxylic, 4-methylcyclohex-4-ene-1,2-dicarboxylic, bicyclo[2.2.1]hept-5-ene-2,3-dicarboxylic and x-methylbicyclo[2.2.1]hept-5-ene-2,3-dicarboxylic a=hydrides.

Examples of other grafting monomers comprise $C_1-C_8$ alkyl esters or glycidyl ester derivatives of usaturated carboxylic acids, such as methyl acrylate, methyl methacrylate, ethyl acrylate, ethyl methacrylate, butyl acrylate, butyl methacrylate, glycidyl acrylate, glycidyl methacrylate, monoethyl maleate, diethyl maleate, monomethyl fumarate, dimethyl fumarate, monomethyl itaconate and diethyl itaconate; amide derivatives of unsaturated carboxylic acids, such as acrylamide, methacrylamide, maleic acid monoamide, maleic acid diamide, maleic acid N-monoethylamide, maleic acid N,N-diethylamide, maleic acid N-monobutylamide, maleic acid N,N-dibutylamide, fumaric acid monoamide, fumaric acid diamide, fumaric acid N-monoethylamide, fumaric acid N,N-diethylamide, fumaric acid N-monobutylamide and fumaric acid N,N-dibutylamide; imide derivatives of unsaturated carboxylic acids, such as maleimide, N-butylmaleimide and N-phenylmaleimide; and metal salts of unsaturated carboxylic acids, such as sodium acrylate, sodium methacrylate, potassium acrylate and potassium methacrylate. Maleic anhydride is preferred.

Various known processes can be used to graft a grafting monomer onto the mixture of (A) and (B).

For example, this can be achieved by heating the polymers (A) and (B) at a high temperature, approximately 150° to approximately 300° C., in the presence or in the absence of a solvent, with or without a radical initiator Appropriate solvents which can be used in this reaction are benzene, toluene, xylene, chlorobenzene, cumene, and the like. Appropriate radical initiators which can be used comprise t-butyl hydroperoxide, cumene hydroperoxide, diisopropylbenzene hydroperoxide, di-t-butyl peroxide, t-butyl cumyl peroxide, dicumyl peroxide, 1,3-bis(t-butylperoxyisopropyl)benzene, acetyl peroxide, benzoyl peroxide, isobutyryl peroxide, bis(3,5,5-trimethylhexanoyl) peroxide and methyl ethyl ketone peroxide.

In the mixture of (A) and (B) modified by grafting obtained in the abovementioned way, the amount of grafting monomer can be chosen appropriately but it is preferably from 0.01 to 10%, better still from 0.1 to 5%, with respect to the weight of grafted (A) and (B).

The amount of grafted monomer is determined by quantitative determination of the succinic functional groups by FTIR spectroscopy.

The cografted mixture of (A) and (B) can be diluted in a polymer (C) chosen from:

(C1) polyethylenes or copolymers of ethylene with a monomer chosen from alpha-olefins, unsaturated carboxylic acid esters or vinyl esters of saturated carboxylic acids. These monomers have already been mentioned in the definition of (A).

(C2) block copolymers of styrene, such as SBS, SEBS or SIS.

Preferably, (C) is chosen from the family of polymers (A), that is to say that it corresponds to the ethylene content, $MI_2/[\eta]^{-8.77}$ and relative density conditions; however, it can be different from the polymer (A) which is intended to be cografted with (B).

The binder must also satisfy the conditions (a), (b) and (c), namely the ethylene content, the carboxylic acid content and the condition of the $MI_{10}/MI_2$ ratio, respectively. The condition (a) limits the amount of (B); in practice, (B) represents 20 to 30 weight % of the mixture (A)+(B). The condition (b) limits the amount of (C). The amount of carboxylic acid or its derivative is preferably from 0.1 to 5% of the weight of the binder, that is to say of grafted ((A)+(B))+(C). In practice, the weight of (C) is at most equal to the weight of grafted [A+B].

As regards the condition (c), it is observed either because grafted ((A)+(B)) and the polymer (C) confirm this condition or because the mixture of grafted (A+B) and (C) confirms it. For example, grafted (A+B) and (C), taken separately, do not observe this condition but their mixture observes it, grafted (A+B) observes it and (c) does not observe it or (C) observes it and grafted (A+B) does not observe it.

The relative density of the binder is advantageously between 0.88 and 0.98 $g/cm^3$.

(A) and (B) can be mixed prior to the grafting or simultaneously with the monomer to be grafted and the initiator.

After the grafting, (c) is optionally added. The usual techniques for mixing thermoplastics in the molten state can be used.

The binder of the invention can further comprise various additives, such as antioxidants, ultraviolet absorbers, antistatic agents, pigments, dyes, nucleating agents, fillers, slip agents, lubricants, flame retardants and antiblocking agents.

Examples of antioxidants are 2,6-di-t-butyl-p-cresol, o-t-butyl-p-cresol, tetrakis[methylene-3-(3,5-di-t-butyl-4-hydroxyphenyl)propionate]methane, p-naphthylamine and para-phenylenediamine.

Examples of ultraviolet absorbers are 2,4-dihydroxybenzophenone, 2-(2'-hydroxy-3', 5'-di-t-butylphenyl)-5-chlorobenzotriazole, 2-(2-hydroxy-3-t-butyl-5-methylphenyl)-5-chlorobenzotriazole and bis(2,2,6,6-tetramethyl-4-piperidinyl) sebacate.

Examples of antistatic agents are lauryldiethanolamine, palmityldiethanolamine, stearyldiethanolamine, oleyldiethanolamine, behenyldiethanolamine, polyoxyethylenealkylamines, stearyl monoglyceride and 2-hydroxy-4-n-octoxybenzophenone.

Examples of dyes comprising pigments and dyes are carbon black, titanium white, cadmium yellow and copper phthalocyanine blue.

Examples of nucleating agents are aluminium p-tert-butylbenzoate, dibenzylidenesorbitol and aluminium hydroxy-di-p-t-butylbenzoate.

Examples of filler are glass fibres, carbon fibres, talc, clay, silica, calcium carbonate, barium sulphate, magnesium hydroxide, calcium hydroxide and calcium oxide.

Examples of slip agents are stearamide, oleamide and erucinamide.

Examples of lubricants are calcium stearate, zinc stearate, aluminium stearate, magnesium stearate and polyethylene wax.

Examples of flame retardants are antimony oxide, decabromobiphenyl ether and bis(3,5-dibromo-4-bromopropyloxyphenyl) sulphone.

Examples of antiblocking agents are silicon dioxide and polystyrene.

The amounts of these other additives can be chosen from the appropriate amounts which do not have an unfavourable effect on the binders of the invention. For example, with respect to the total weight of grafted (A+B)+(C), the appropriate amounts are from approximately 0.01 to approximately 5 weight % for the antioxidants; approximately 0.01 to approximately 5 weight % for the ultraviolet absorbers; approximately 0.01 to approximately 1 weight % for the antistatic agents; approximately 0.01 to approximately 5 weight % for the colouring agents; approximately 0.01 to approximately 5 weight % for the nucleating agents; approximately 0.1 to approximately 60 weight % for the fillers; approximately 0.01 to approximately 1 weight % for the slip agents approximately 0.01 to approximately 1 weight % for the lubricants; approximately 0.1 to approximately 50 weight % for the flame retardants; and approximately 0.01 to approximately 30 weight % for the antiblocking agents.

The multilayer structure of the present invention is composed of the layer comprising the above binder and of a layer (E) of oxygen-containing or nitrogen-containing polar resin or a metal layer.

Examples of polar resins which are preferred in the layer other than the binder are polyamide resins, a saponified copolymer of ethylene and of vinyl acetate, and polyesters.

More specifically, they comprise long-chain synthetic polyamides having structural units of the amide group in the main chain, such as PA-6, PA-6,6, PA-6,10, PA-11 and PA-12; a saponified copolymer of ethylene and of vinyl acetate having a degree of saponification of approximately 90 to 100 mol %, obtained by saponifying an ethylene/vinyl acetate copolymer having an ethylene content of approximately to approximately 60 mol %; polyesters, such as poly(ethylene terephthalate), poly(butylene terephthalate) or poly(ethylene naphthenate), and mixtures of these resins.

The metal layer can be, for example, a sheet or a film of a metal, such as aluminium, iron, copper, tin and nickel, or an alloy containing at least one of these metals as main constituent. The thickness of the film or of the sheet can be appropriately chosen and it is, for example, from approximately 0.01 to approximately 0.2 mm. It is common practice to degrease the surface of the metal layer before laminating the binder of the invention onto it. The layer of oxygen-containing or nitrogen-containing polar resin (E) can also contain known additives in a conventional amount.

The invention also relates to a structure is comprising, respectively, a polyolefin layer (F), a layer of the binder of the invention and either a layer (E) of nitrogen-containing or oxygen-containing polar resin or a metal layer.

According to a specific form, the invention relates to a structure comprising, respectively, a layer of high density polyethylene (HDPE), a layer of the binder of the invention and a layer of polyamide or of alloy of polyolefin and of polyamide. This latter layer is preferably a polyamide of amorphous PA type; for example, Selar PA 3426 or Grivory G21. The MFI values are, for example, HDPE : MFI=0.8 at 190° C.; 2.16 kg, binder: MFI=1. It is advantageously provided in the form of rigid hollow bodies with a volume of 0.1 to 5 liters having the HDPE layer on the outside. The thicknesses are respectively (in $\mu$m), beginning with the HDPE: 200 to 500/10 to 40/20 to 70. These bottles make it possible to store fresh fruit juice at room temperature for 12 weeks. The HDPE layer can be replaced by two layers, the outer one made of virgin HDPE and the other made of recycled material originating from the scrap and offcuts from the extrusion blow-moulding of the hollow bodies.

According to another specific form, the invention relates to a structure comprising respectively a layer of HDPE, a layer of the binder of the invention, a layer of EVOH or of an alloy of EVOH, a layer of the binder of the invention and a layer of HDPE. It is advantageously provided in the form of rigid hollow bodies with a volume of 0.1 to 5 liters. The thicknesses (in $\mu$m) are respectively, beginning with the outer HDPE layer:

(outer) 200 to 500/10 to 40/20 to 50/10 to 40/40 to 100 (inner)

The MFI of the HDPE is preferably 0.3 to 0.8 at 190° C., 2.16 kg.

The MFI of the EVOH is preferably 1.7 to 4 at 190° C., 2.16 kg.

The HDPE layers can contain pigments or dyes.

The outer HDPE layer can advantageously be replaced by two layers, the outer one made of optionally coloured virgin HDPE and the other made of recycled material originating from the scrap and offcuts from the extrusion blow-moulding of these hollow bodies. The thickness of the outer HDPE layer, added to the thickness of the recycled layer, is essentially the same as in the case of a single outer HDPE layer. The recycled layer preferably contains carbon black, in order to screen out the light. This barrier structure with respect to light and with respect to oxygen, by virtue of the EVOH layer, makes it possible to store fruit flavours at room temperature for at least 6 months.

The preceding structures;

HDPE/binder/EVOH/binder/HDPE (inner) and HDPE/recycled material/binder/EVOH/binder/HDPE (inner) also have the advantage of being recyclable, it being possible for these hollow bodies to be milled and remelted in order to form the intermediate layer between the outer HDPE layer and the binder layer in structures:

HDPE/Recycled material/binder/EVOH or polyamide
HDPE/Recycled material/binder/EVOH or polyamide/binder/HDPE (inner)

However, care should be taken that the recycled layer is composed of at least 50 weight % of HDPE and does not exhibit EVOH lamellae resulting in delamination, The invention also relates to a structure comprising respectively an EVOH layer (F), a layer of the binder of the invention and a layer (E) of nitrogen-containing or oxygen-containing polar resin.

According to a particularly advantageous form, the structure comprises respectively a layer of polypropylene, a layer of a grafted polypropylene as binder, a layer of EVOH, a layer of the binder of the invention and a layer of polyamide or of a polyamide alloy. It is useful for making rigid hollow bodies with a volume of 0.1 to 5 liters having the polypropylene layer on the outside. The polypropylene can be a homopolymer or a largely propylene copolymer. The grafted polypropylene useful as binder between the outer layer and the EVOH is, for example, a polypropylene grafted with maleic anhydride (MAH) (containing 0.2% of MAH) and having an MFI of 2 to 5 at 230° C., 2.16 kg. Very transparent polypropylene and polyamide grades can be chosen; by way of example, if the polypropylene of the outer layer is of 3022GT3 type and the polyamide of the inner layer is of Selar PA3426 type, the structure is completely transparent.

The thicknesses can be respectively (in $\mu$m), beginning with the polypropylene:

250 to 400/20 to 50/20 to 50/20 to 50/30 to 100 (inner) As with the preceding structures, the outer polypropylene layer can be replaced by an outer layer of virgin polypropylene and a layer of recycled material originating from the scrap and offcuts.

The hollow bodies derived from this structure make it possible to store fruit juice for 12 months at a temperature of 20° C.

These rigid hollow bodies can be manufactured by the extrusion blow-moulding technique.

The structures of the invention, except those containing metal, whether they are in the form of waste hollow bodies or of parisons or others, can be recycled, either directly during the manufacture of the hollow bodies, as explained above, or by mixing into HDPE or polypropylene (depending on their content), in order to manufacture all kinds of blown or injected products. This is because the presence of the binder of the invention and optionally of the grafted polypropylene makes it possible to compatibilize the EVOH and/or the polyamide. These hollow bodies are easy to manufacture, can be recycled and have barrier properties with respect to oxygen and to flavours which are virtually identical to those of conventional materials, such as glass or aluminium. Glass packagings can be recycled but the use of high temperatures (1000° C. or more) is necessary and their weight is high in comparison with the structures of the invention As packagings comprising aluminium also comprise thermoplastics, such as polyethylene, and/or paper or cardboard, it is impossible to separate the aluminium.

EXAMPLES

Example 1 a) Binder according to the invention

A-1 denotes an ethylene-octene copolymer containing 3.5 mol % of octane with a relative density of 0.920

B1-1 denotes an ethylene-propylene copolymer containing 15.4 mol % of propylene with a relative density of 0.890 and with properties:

|      | $MI_2$ | $\eta$ | $MI_2/[\eta]^{-8.77}$ |
|------|--------|--------|----------------------|
| A-1  | 4.4    | 1.3    | 43.9                 |
| B1-1 | 0.2    | 2.6    | 871.5                |

$MI_2$ = Melt flow index under 2.16 kg 75 parts of A-1 and 25 parts of B1-1 are mixed and grafted with maleic anhydride (MAH); the grafted amount of MAH is 0.36 weight %.

The amount of (C) is 0.

b) Binders not in accordance with the invention A-1 and B1-1 are grafted separately and different binders, denoted Product 1, Product 2 and Product 3, are prepared. Product 3 is in accordance with EP 35392.

The advantages of the binder of the invention in terms of unmelted regions are presented in the following Table 1. In this table, "gr MAH" means "grafted with maleic anhydride" and the % are by weight.

| Composition | (75% A-1 + 25% B1-1) gr MAH | (75% A-1) gr MAH (25% B1-1) gr MAH | 75% A-1 (25% B1-1) gr MAH | (75% A-1) gr MAH 25% B1-1 |
|---|---|---|---|---|
| Grafted maleic anhydride (%) | 0.2–0.36 | 0.22 | 0.044 | 0.15 |
| $MI_2$ (190° C./2.16 kg) | 0.85 | 0.87 | 1.6 | 0.67 |
| Number of unmelted regions in the extruded films* film thickness | | | | |
| 150 $\mu$m | 40 | (perforated) | (perforated) | (perforated) |
| 50 $\mu$m | 40 | >200 | 120 | >220 |
| Number of unmelted regions with respect to 50 $\mu$m Thoret films | | | | |
| small (<200 $\mu$m) | 40 | >100 | 80 | >100 |
| medium | 0 | >100 | 40 | >100 |
| large (>800 $\mu$m) | 0 | 0 | 0 | 20 |

*Number of unmelted regions in 17 cm × 100 cm extruded films

Example 2

A rigid hollow body with the 3-layer structure:

HDPE/binder/PA (inner) with respective thicknesses ($\mu$m) 420 30 50 was manufactured on a Bekum type BAE3 3-layer blow-moulding machine.

The HDPE is of 2008 SN60 type: MFI=0.8 at 190° C., 2.16 kg; relative density 0.96 The binder is that of Example 1a and makes it possible to obtain excellent adhesion between PE and PA. The PA is an amorphous PA of Selar PA 3426 type. The storage of the fruit juice flavours is 12 weeks.

Example 3

A rigid hollow body with the 5-layer structure

HDPE/binder/EVOH/binder/HDPE (inner)

240 30 35 30 50 (respective thicknesses in $\mu$m)

was manufactured in a Bakum 5-layer blow-moulding machine.

The HDPE in of the 2008 SN 60 type. The binder in that of Example 1a and makes it possible to obtain excellent adhesion between PE and EVOH, it contains 29 molar % of ethylene and its MFI is 1.7 at 190° C. under 2.16 kg, and makes it possible to obtain a good barrier effect to gases in multilayer structures. This structure makes it possible to achieve a storage life for fruit juice flavours of 6 months. The production waste can be recycled, optionally into a 6th layer, and in this case a structure of the type HDPE/recycled material/binder/EVOH/binder/HDPE 120 120 30 35 30 50(respective thicknesses in μm) is produced.

Example 4

A rigid hollow body with the 5-layer structure:
of the type:
PP/FT-PP/EVOH/binder/Selar PA (inner)
with the following thicknesses (in μm):
340 30 50 30 50
was manufactured on a Bekum 5-layer blow-moulding machine.

The PP is of the 3022GT3 type from Appryi (transparent) MFI=2 at 230° C., 2.16 kg The binder according to Example 1a makes it possible to obtain excellent adhesion between EVOH and PA.

FT-PP denotes a polypropylene (PP) binder with an MFI of 4 (230° C., 2.16 kg) grafted with maleic anhydride. It makes it possible to obtain excellent adhesion between PP and EVOH.

The EVOH is of the Soarnol DT type.

This multilayer bottle has good transparency.

This 5-layer structure makes it possible to achieve a storage life for fruit juice flavours of 12 months.

Selar PA denotes PA according to 3426, as an inner layer. It has good chemical inertia and, for this reason, makes it possible to obtain better results for the organoleptic tests than EVOH or PP.

Although the invention has been described in conjunction with specific embodiments, it is evident that many alternatives and variations will be apparent to those skilled in the art in light of the foregoing description. Accordingly, the invention is intended to embrace all of the alternatives and variations that fall within the spirit and scope of the appended claims. The above references are hereby incorporated by reference.

What is claimed is:

1. A multilayer structure comprising respectively a first layer of high density polyethylene (HDPE), a first layer of a binder, a layer of a saponified copolymer of ethylene and of vinyl acetate (EVOH) or of a derivative of EVOH, a second layer of a binder and a second layer of HDPE,
wherein said binder comprises:
a mixture of at least one polymer (A) comprising at least 75 mol % of ethylene and which has an $MI_2/(\eta)^{-8.77}$ ratio with an absolute value greater than 15, and at least one polymer (B) different from (A) selected from the group consisting of polymers having at least 50 mol% of ethylene and block copolymers of styrene;
wherein (B) has an $MI_2/(\eta)^{-8.77}$ ratio with an absolute value of greater than 15; and wherein η denotes the viscosity index (dl/g) of the respective polymer measured in a decalin solution at 135° C.;
the mixture of (A) and (B) being grafted with an unsaturated carboxylic acid or a compound of this acid;
the cografted mixture of (A) and (B) optionally being diluted in a polymer (C) selected from the group consisting of homo- or copolymers of ethylene and block copolymers of styrene;
the binder further having:
(a) an ethylene content which is not less than 70 mol %;
(b) a carboxylic acid content or a content of the compound of this acid of 0.01 to 10 weight % with respect to the weight of the binder, and
(c) a $MI_{10}/MI_2$ ratio of 5 to 20, where $MI_2$ is the melt flow index at 190° C. under a load of 2.16 kg, measured according to ASTM D1238, and $MI_{10}$ is the melt flow index at 190° C. under a load of 10 kg, measured according to ASTM D1238.

2. The multilayer structure of claim 1, wherein the multilayer structure is in the form of rigid hollow bodies with a volume of 0.1 to 5 liters.

3. The multilayer structure of claim 1, wherein the first layer of HDPE has a thickness of between 200 to 400 μm, the first layer of the binder has a thickness of between 10 to 40 μm, the layer of EVOH or of the derivative of EVOH has a thickness of between 20 to 50 μm, the second layer of the binder has a thickness of between 10 to 40 μm and the second layer of HDPE has a thickness of between 40 to 100 μm.

4. The multilayer structure of claim 1, wherein the HDPE has a melt flow index (MFI) of between 0.3 to 0.8 at 190° C. under a load of 2.16 kg.

5. The multilayer structure of claim 1, wherein the EVOH or the derivative of EVOH has a melt flow index (MFI) of between 1.7 to 4 at 190° C. under a load of 2.16 kg.

6. The multilayer structure of claim 1, wherein the HDPE layers further comprise pigments or dyes.

7. The multilayer structure of claim 1, further comprising a layer of recycled material between the first layer of HDPE and the first layer of the binder.

* * * * *